(12) United States Patent
Kamada

(10) Patent No.: US 8,144,287 B2
(45) Date of Patent: Mar. 27, 2012

(54) OPTICAL MEMBER UNIT, LIGHTING DEVICE FOR DISPLAY, DISPLAY, AND TELEVISION RECEIVER

(75) Inventor: Kentaro Kamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 361 days.

(21) Appl. No.: 12/594,303

(22) PCT Filed: Dec. 5, 2007

(86) PCT No.: PCT/JP2007/073458
§ 371 (c)(1),
(2), (4) Date: Oct. 1, 2009

(87) PCT Pub. No.: WO2008/120420
PCT Pub. Date: Oct. 9, 2008

(65) Prior Publication Data
US 2010/0134721 A1    Jun. 3, 2010

(30) Foreign Application Priority Data

Apr. 2, 2007 (JP) ................... 2007-096585

(51) Int. Cl.
G02F 1/1335 (2006.01)
G02B 27/12 (2006.01)
F21V 5/04 (2006.01)
(52) U.S. Cl. ............. 349/65; 349/56; 349/57; 359/619; 362/619
(58) Field of Classification Search ............ 349/56, 349/57, 58, 60, 95, 112, 65, 200; 358/208.11, 358/332, 333.08, 360, 761, 766, 781, 790, 358/791, 794, 825, 827, 832, 836; 359/619; 362/619
See application file for complete search history.

(56) References Cited

U.S. PATENT DOCUMENTS

| 5,519,539 A * | 5/1996 | Hoopman et al. ............ 359/741 |
| 6,031,591 A * | 2/2000 | Hamanaka ....................... 349/95 |
| 6,097,434 A * | 8/2000 | DeLeeuw ...................... 348/340 |
| 6,917,474 B2 * | 7/2005 | Borrelli et al. ................ 359/619 |
| 6,950,234 B1 | 9/2005 | Onishi |

(Continued)

FOREIGN PATENT DOCUMENTS

JP    6-301033 A    10/1994

(Continued)

*Primary Examiner* — Brian Healy
(74) *Attorney, Agent, or Firm* — Birch, Stewart, Kolasch & Birch, LLP

(57) ABSTRACT

An optical member 15 is constituted by sticking a lens sheet 28 capable of transmitting light irradiated toward a liquid crystal panel 11 and a diffuser sheet 27 together. The lens sheet 28 is provided with a lens portion 30 having a large number of unit lenses 29 aligned on the front surface, while on the rear surface, provided with a reflecting layer 32 having an opening 31 corresponding to the lens portion 30. The optical member 15 is received on the backside by receiving members 21 and 24 provided respectively in a holder 17 and a lamp holder 16, while being held from the front by a frame 18. An inclined posture supporting member 33 is provided in the receiving member 24 in the holder 17, which supports the optical member 15 in a posture so that the edge 15a of the optical member 15 and the arrangement of the unit lenses 29 are inclined relatively to the arrangement of the pixel electrodes PE in the liquid crystal panel 11, by abutting an outer circumferential end surface 15b in the optical member 15.

10 Claims, 15 Drawing Sheets

U.S. PATENT DOCUMENTS

| | | | |
|---|---|---|---|
| 7,439,938 B2 * | 10/2008 | Cho et al. | 345/1.3 |
| 2006/0244878 A1 | 11/2006 | Kim et al. | |
| 2010/0134721 A1 * | 6/2010 | Kamada | 349/65 |

FOREIGN PATENT DOCUMENTS

| | | |
|---|---|---|
| JP | 9-197106 A | 7/1997 |
| JP | 2005-221619 A | 8/2005 |
| JP | 2006-17957 A | 1/2006 |
| JP | 2006-276588 A | 10/2006 |
| JP | 2006-309002 A | 11/2006 |
| JP | 2007-41172 A | 2/2007 |
| JP | 2007-42540 A | 2/2007 |
| WO | WO-01/14913 A1 | 3/2001 |
| WO | WO-2006/123472 A1 | 11/2006 |

* cited by examiner

OPTICAL MEMBER UNIT, LIGHTING DEVICE FOR DISPLAY, DISPLAY, AND TELEVISION RECEIVER

FIELD OF THE INVENTION

The present invention relates to an optical member unit, a lighting device for display, a display, and a television receiver.

BACKGROUND ART

A liquid crystal display device is composed of a liquid crystal panel as a display panel and a backlight as an external light source placed in the rear surface side of the liquid crystal panel. Among these, the backlight comprises a plurality of cold cathode fluorescent lamps as a linear light source and an optical member for converting a linear light emitted from each cold cathode fluorescent lamp into a surface light. The optical member is constituted normally by laminating multiple of such as a diffuser plate, a diffuser sheet, a lens sheet, and a brightness enhancing sheet, however, with such configuration, the emitted light is diffused easily in a direction not used for display, resulting in undesirable light use efficiency.

Considering the foregoing, the invention disclosed in Patent Literature 1 has been known as an example of the optical member having improved light use efficiency. In the above invention, a lens portion having a plurality of unit lenses arrayed therein is provided on the front surface, whereas a reflecting layer having an opening is provided on the back surface. The reflecting layer is placed in the area corresponding to the part where lights of the unit lenses are not converged, whereas the opening is placed in the area corresponding to the light converging part of the unit lenses, and therefore, the light diffusing angle can be easily controlled by adjusting the size ratio between the reflecting layer and the opening. Consequently, the emitted light in the direction not used for display can be reduced, and thereby improving the light use efficiency.

[Patent Literature 1]: Japanese Unexamined Patent Publication No. 2005-221619

PROBLEM TO BE SOLVED BY THE INVENTION

On the other hand, when using the optical member comprising a lens portion as an optical member for the backlight, the following problem may occur. In short, when interference occurred between the arrangement of pixels provided in a liquid crystal panel and the arrangement of the unit lenses composing the lens portion, display defect called moire may appear. As a method for avoiding moire, for example, the optical member in which the arrangement of the unit lenses is inclined relative to the edge of the optical member may be produced and used, so as to incline the arrangement of the unit lenses relative to the pixel arrangement.

However, the above-mentioned countermeasure needs to produce a particular kind of optical member with the arrangement of the unit lenses inclined relative to the edge, and may result in a cost increase. Particularly, like the above-mentioned Patent Literature 1, regarding the optical member comprising a lens portion on the front side while comprising the opening and the reflecting layer corresponding to the lens portion on the back side, it is extremely difficult to produce the one in which the arrangement of the unit lenses is inclined relative to the edge, and a more effective countermeasure against moire has therefore been required.

DISCLOSURE OF THE INVENTION

The present invention has been completed based on the above circumstances, and its purpose is to provide an optical member unit in which moire can be avoided while using an optical member having unit lenses arranged in parallel with the edge.

MEANS FOR SOLVING THE PROBLEM

The present invention comprises: an optical member capable of transmitting light irradiated toward a display panel and comprising a lens portion where a plurality of unit lenses are arranged in parallel with the edge, a positioning member forming a nearly frame shape and capable of positioning the optical member in a prescribed posture relative to the display panel, and an inclined posture supporting member which supports the optical member in a posture so that the edge of the optical member and the arrangement of the unit lenses incline relatively to the arrangement of pixels formed on the display panel, while being provided in the positioning member in a manner so as to extend in parallel with the edge of the optical member.

Thereby, the occurrence of moire caused by the interference between the arrangement of pixels in the display panel and the arrangement of the unit lenses can be prevented by the inclined posture supporting member, while using the optical member comprising the lens portion wherein the unit lenses are arranged in parallel with the edge. Accordingly, a measure can be taken against moire without using a particular optical member in which the unit lenses are arranged while being inclined relative to the edge. Moreover, the inclined posture supporting member is in a manner so as to extend in parallel with the edge of the optical member, and thereby supporting the optical member firmly.

DESCRIPTION OF SYMBOLS

Best Mode for Carrying Out the Invention

Embodiment 1

Embodiment 1 of the present invention is explained in reference to FIGS. 1 to 11. In Embodiment 1, a liquid crystal display device D is exemplified as a display.

Figure 1:
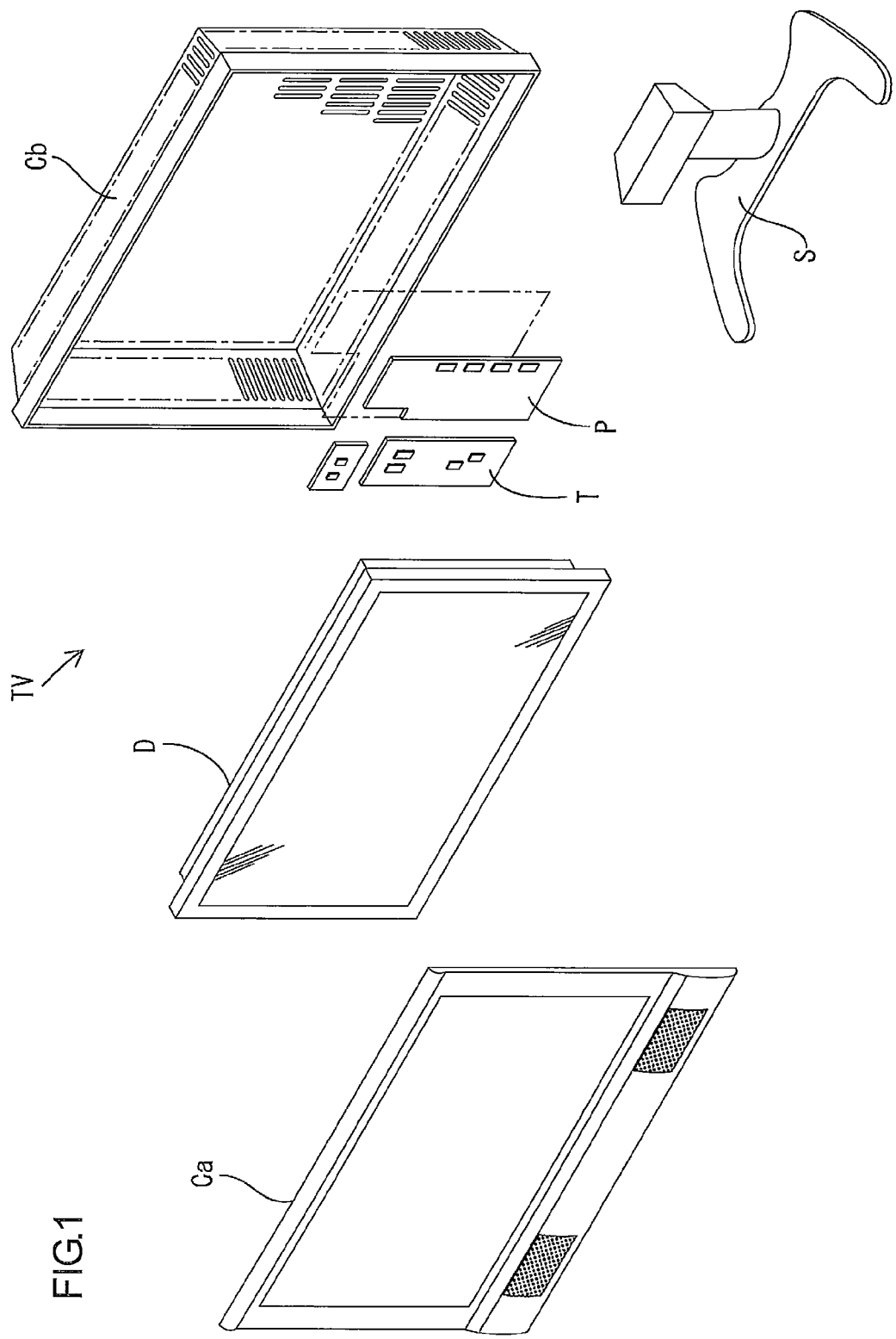
FIG. 1 is an exploded view showing an outline of a television receiver according to Embodiment 1 of the present invention.
Figure 2:
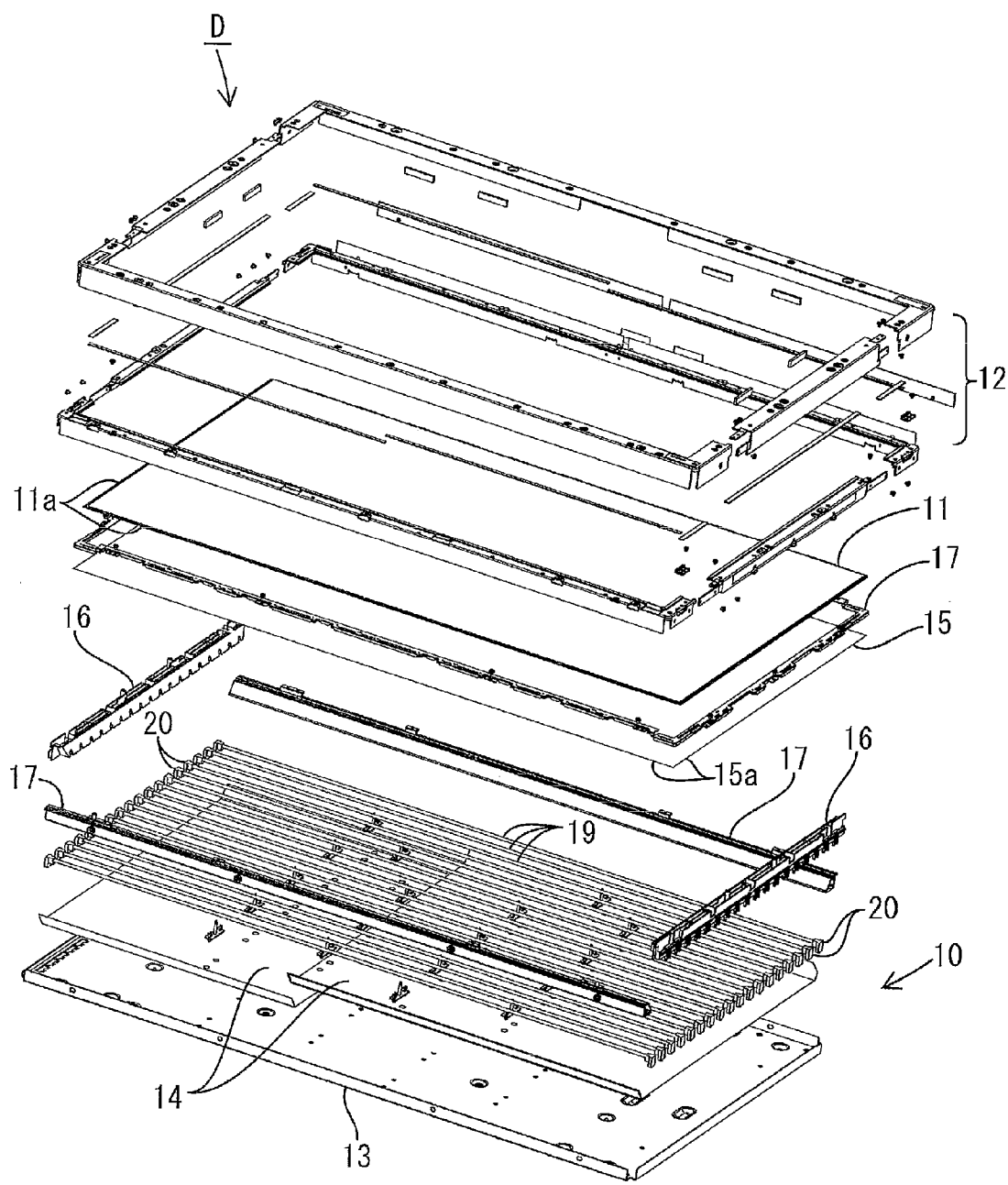
FIG. 2 is an exploded perspective view showing an outline of a liquid crystal display device.

The liquid crystal display device D has a laterally long square shape on the whole, and is constituted by, as shown in FIG. 2, holding a liquid crystal panel 11 as a display panel and a backlight 10 as an external light source (lighting device) of the liquid crystal panel 11 into a fitted-state by a bezel 12 covering from the front side. The liquid crystal panel 11 is disposed in the front side of the backlight 10, and irradiated by the backlight 10 from the rear surface side. The liquid crystal display device D can be applied to a television receiver TV. The television receiver TV is constituted by comprising, as shown in FIG. 1, the liquid crystal display device D, both front and rear cabinets Ca and Cb housing the liquid crystal display device D in a manner so as to hold it from both sides, a power source P, a tuner T, and a stand S.

Figure 3:
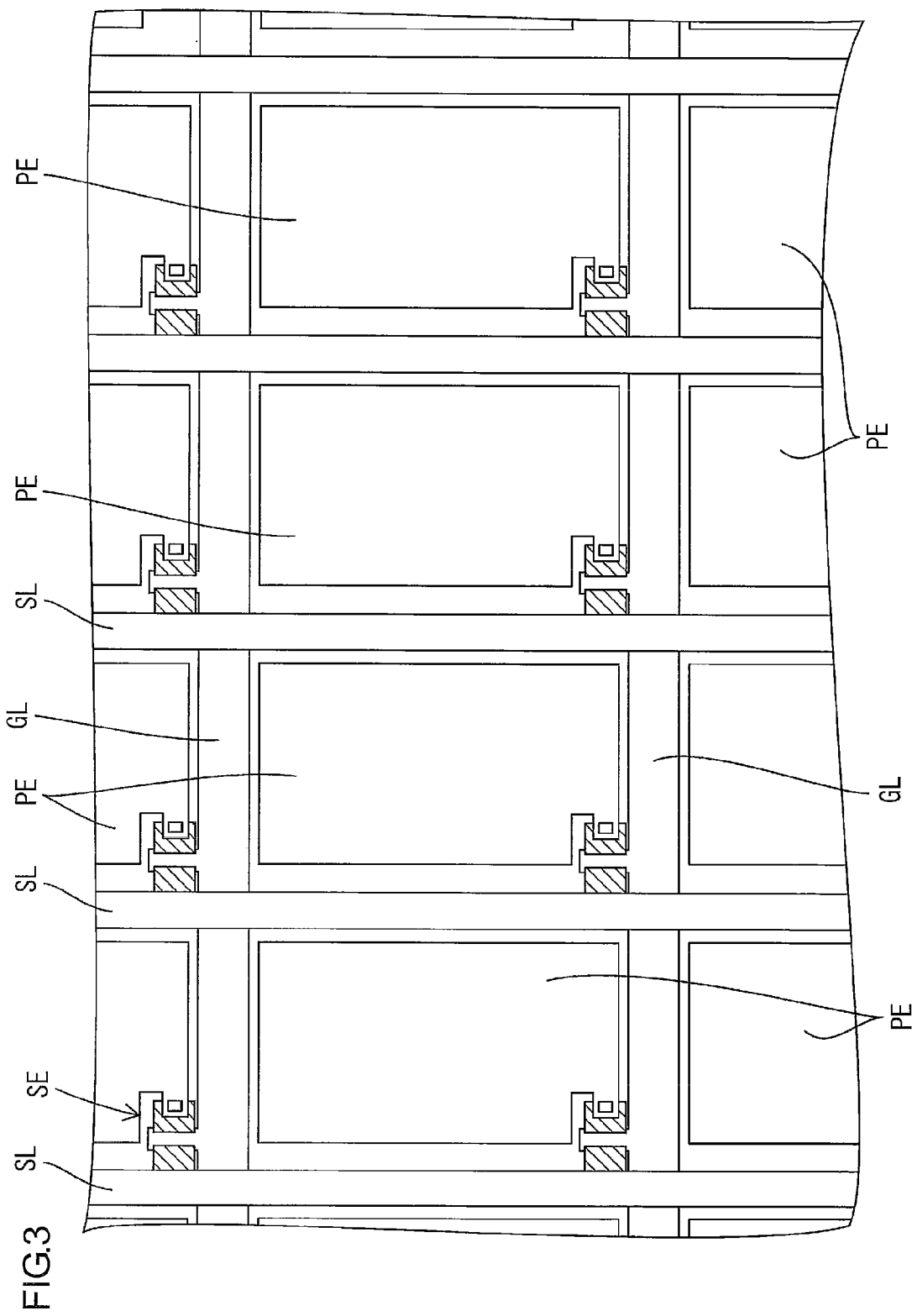
FIG. 3 is a plan view of a TFT substrate of a liquid crystal panel.
Figure 4:
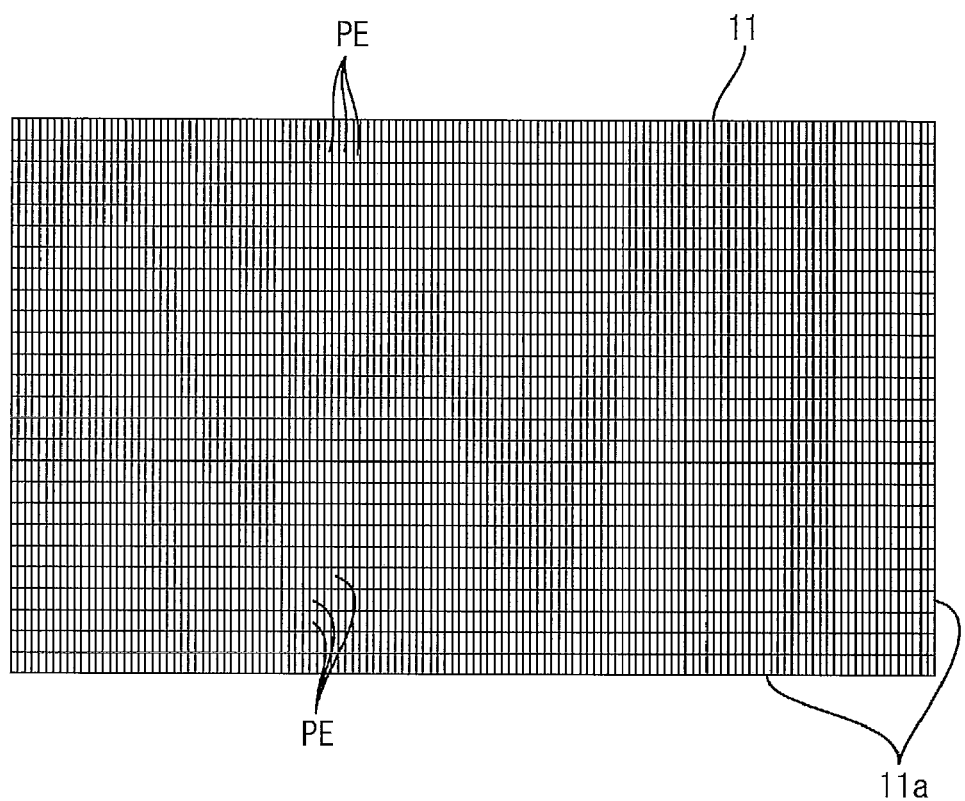
FIG. 4 is a plan view showing an outline of the arrangement of pixel electrodes in the liquid crystal panel.
Figure 6:
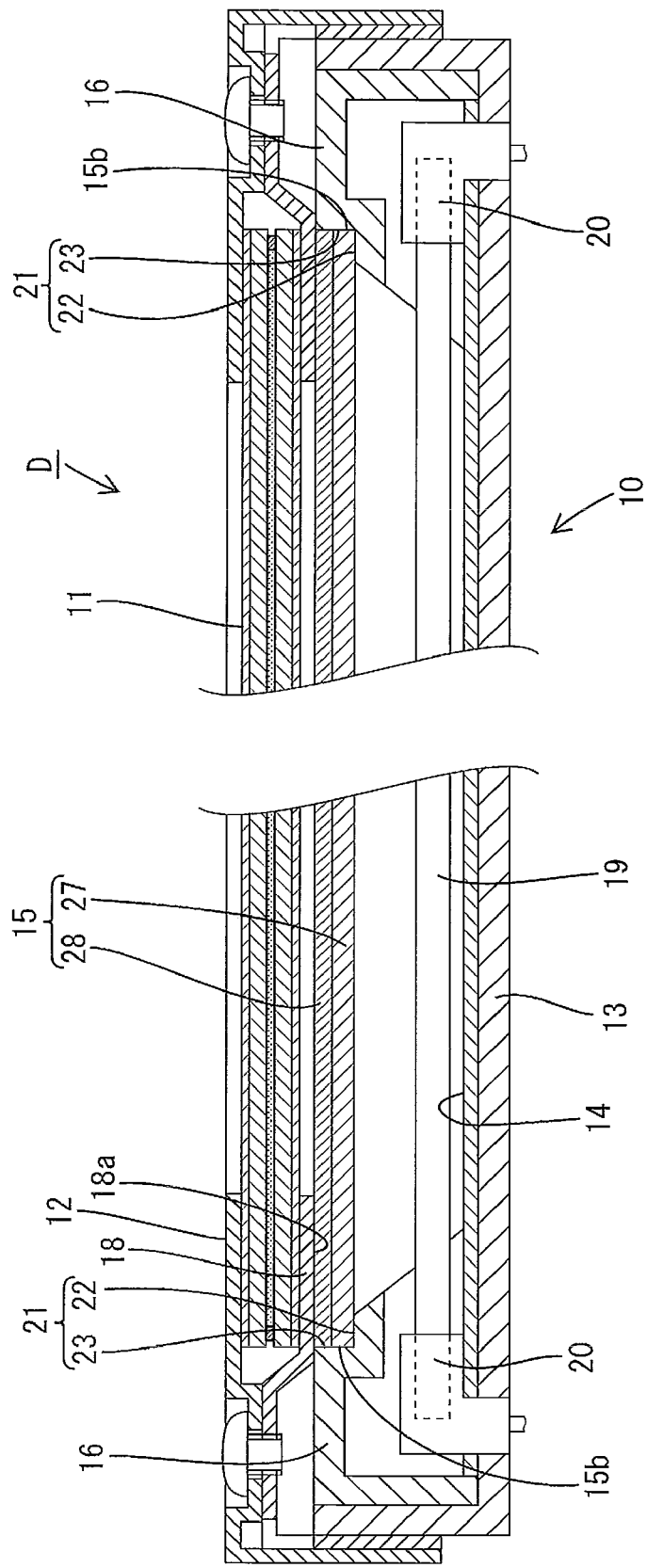
FIG. 6 is a cross sectional view of the liquid crystal display device taken along a line X-X shown in FIG. 5.

As shown in FIG. 6, the liquid crystal panel 11 has a known structure comprising a liquid crystal as a material having an optical property changable in accordance with voltage application sealed in between a transparent TFT substrate and a transparent CF substrate. As shown in FIG. 3, a large number of source wirings SL extending longitudinally and gate wirings GL extending laterally in the figure are arranged on the inner surface of the TFT substrate in the backside, forming a grid pattern. Both wirings SL and GL are connected to an external circuit (not shown) capable of supplying such as image signals. Each square area surrounded by both wirings SL and GL is provided with a large number of switching elements SE such as TFT and transparent pixel electrodes PE aligned therein. The arrangement of the pixel electrodes PE in the liquid crystal panel 11 (pixel arrangement) is, as shown in FIG. 4, in a manner so as to align in parallel with an edge 11a in the long side and the short side of the liquid crystal panel 11. Additionally, the pitch between each wiring SL and GL as well as the arrangement spacing of the pixel electrodes PE may be changed in accordance with the screen size and the number of pixels of the liquid crystal panel 11. For example, in the liquid crystal panel 11 outputting 1920×1080 pixels with the 45-inch screen size, the arrangement spacing of the pixel electrodes PE (pixel pitch) is specified around 513 μm in the long side, while around 171 μm in the short side (one third of the long side). On the other hand, a color filter having colored parts of the three primary colors: red (R), green (G), and blue (B) arranged in a matrix state is provided in the CF substrate. And also, a polarization plate is attached to the surface opposite to the liquid crystal side in both substrates.

The backlight 10 is so-called a direct type, comprising: a chassis 13 opening in the front surface (the upper front side in FIG. 2), a reflective sheet 14 laid inside of the chassis 13, an optical member 15 mounted in the opening part of the chassis 13, a positioning member capable of positioning the optical member 15 in a prescribed posture relative to the liquid crystal panel 11 (the later described lamp holder 16, holder 17, and frame 18), and a plurality of cold cathode fluorescent lamps 19 housed inside of the chassis 13.

The chassis 13 is made of a metal and formed in a nearly box shape, rectangular in plan view and opening in the front surface as shown in FIG. 6. The reflective sheet 14 is made of synthetic resin, with the front surface generally being white that is superior in reflexibility, and laid on, as covering, nearly the whole area of the inner surface of the chassis 13. This reflective sheet 14 can guide the light emitted from each cold cathode fluorescent lamp 19 toward the opening side of the chassis 13. The cold cathode fluorescent lamp 19 is a type of linear light sources, and mounted in the chassis 13 in a posture so that its axial direction is coincident with the long side direction of the chassis 13. A plurality of the cold cathode fluorescent lamps 19 are aligned, with their axes nearly parallel each other, and with a prescribed spacing between each other. In addition, a rubber holder 20 is respectively fitted to both ends of the cold cathode fluorescent lamp 19, and this rubber holder 20 is inserted into a mounting hole in the chassis 13, so as to mount the cold cathode fluorescent lamp 19 in the chassis 13.

Figure 5:
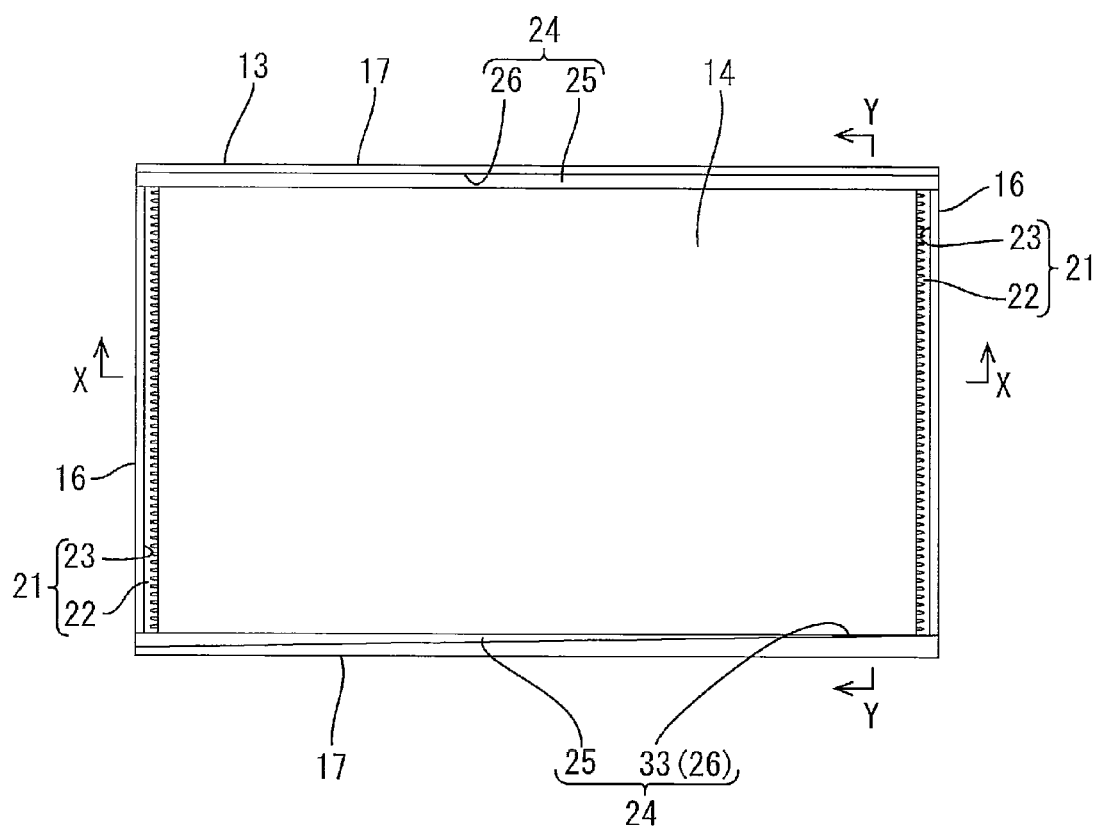
FIG. 5 is a plan view showing a mounted-state of a lamp holder and a holder in a chassis.

The positioning member is constituted of a lamp holder 16 and a holder 17 as a receiving member for receiving the optical member 15 on the backside, and a frame 18 in a frame shape as a holding member for holding the optical member 15 from the front side. As shown in FIG. 5, the lamp holder 16 and the holder 17 are forming a frame shape on the whole by being arranged in the outer circumferential end position of the chassis 13, and constituted so as to receive nearly the entire outer circumferential end of the optical member 15 on the backside.

The lamp holder 16 is made of synthetic resin (for example, polycarbonate or polypropylene), and as shown in FIGS. 5 and 6, a pair thereof is mounted in both end positions in the long side direction of the chassis 13, while extending along the short side direction of the chassis 13. The lamp holders 16 form a nearly box shape, opening in the rear surface, and are constituted so as to collectively cover each rubber holder 20 attached to each cold cathode fluorescent lamp 19 from the front side. Formed in a manner so as to be recessed in steps in the end of the inner circumferential side on the front surface of the lamp holder 16 is a receiving member 21 capable of receiving the optical member 15. The receiving member 21 comprises a plate surface receiving surface 22 opposed to the plate surface along the surface direction in the optical member 15 and receiving this plate surface and an end surface receiving surface 23 opposed to an outer circumferential end surface 15b along the thickness direction in the optical member 15 and receiving the outer circumferential end surface 15b. The plate surface receiving surface 22 can determine the position of the optical member 15 in a direction orthogonal to its surface direction (thickness direction), while the end surface receiving surface 23 can determine the position of the optical member 15 in its surface direction. The plate surface receiving surface 22 is nearly in parallel with the plate surface of the optical member 15, while the end surface receiving surface 23 is nearly in parallel with the outer circumferential end surface 15b of the optical member 15.

Figure 7:
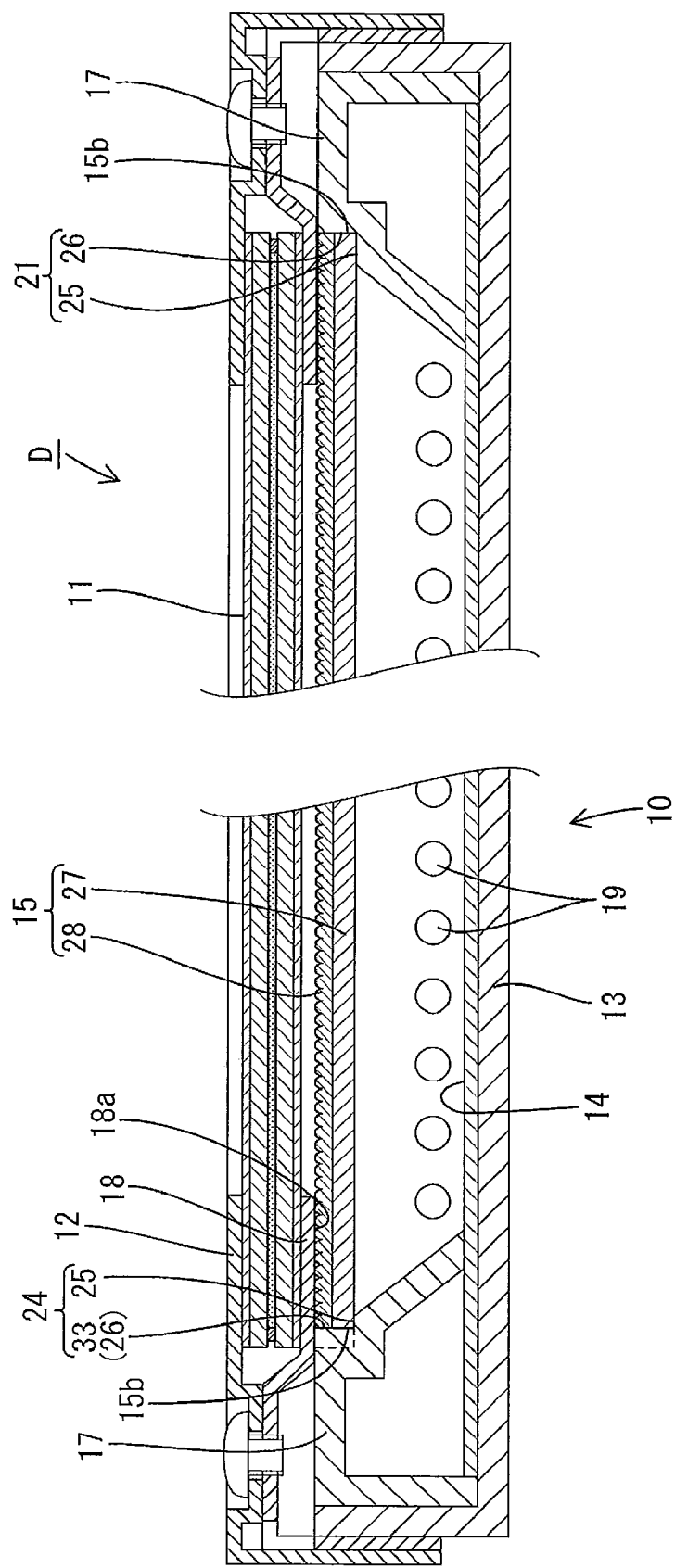
FIG. 7 is a cross sectional view of the liquid crystal display device taken along a line Y-Y shown in FIG. 5.

The holder 17 is made of synthetic resin (for example, polycarbonate or polypropylene), and as shown in FIGS. 5 and 7, a pair thereof is mounted in both end positions in the short side direction of the chassis 13, while extending along the long side direction of the chassis 13. Formed in a manner so as to be recessed in steps in the end of the inner circumferential side on the front surface of the holder 17 is a receiving member 24 capable of receiving the optical member 15. This receiving member 24 has structure and function similar to those of the receiving member 21 in the lamp holder 16 (a plate surface receiving surface 25 and an end surface receiving surface 26), and a repetitive description thereof is omitted.

The frame 18 is made of a metal and formed in a frame shape, and, as shown in FIGS. 6 and 7, constituted so as to hold nearly the entire outer circumferential end of the optical member from the front side. The frame 18 has in the inner circumferential end thereof a holding surface 18a opposed to the plate surface of the optical member 15. In a fitted state, the holding member 18a is disposed in a position with a slight clearance relative to the plate surface of the front side of the optical member 15, and thereby allowing heat expansion and heat contraction of the optical member 15.

The optical member 15 transforms a linear light emitted from each cold cathode fluorescent lamp 19 as a linear light source into a surface light, while having functions such as for directing the light toward the display region in the liquid crystal panel 11. The optical member 15 is formed into a laterally long rectangular shape similar to the liquid crystal panel 11 and the chassis 13, and is constituted by sticking the diffuser sheet 27 disposed in the backside and the lens sheet 28 disposed in the front side together. The diffuser sheet 27 has a base material made of translucent synthetic resin, and countless light scattering particles are dispersed therein for scattering the light.

Figure 8:
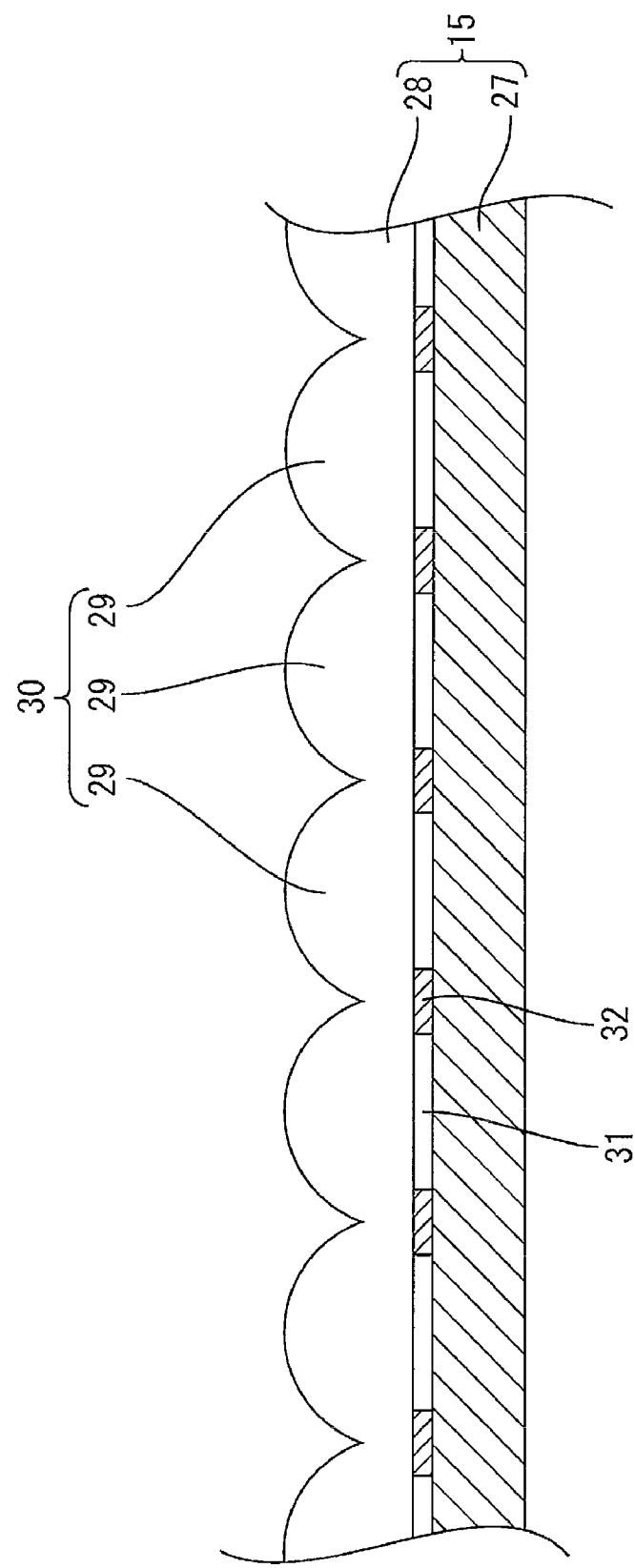
FIG. 8 is an enlarged cross sectional view of the optical member.
Figure 9:
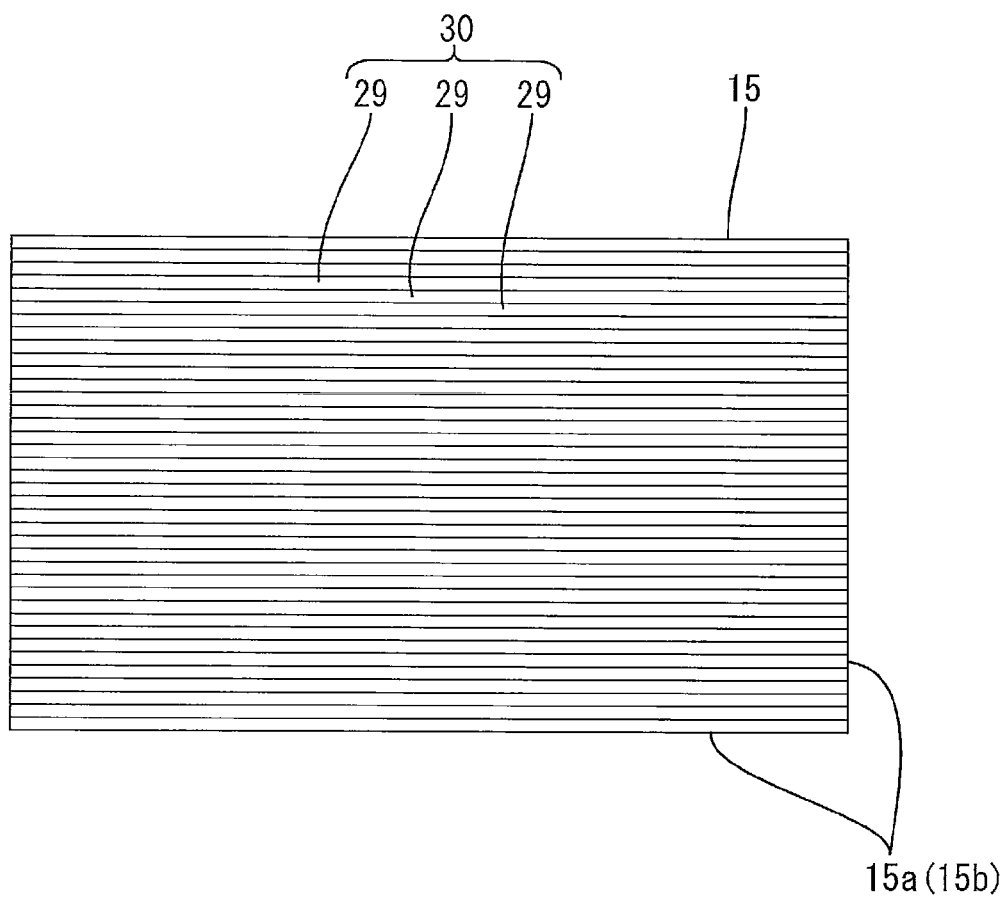
FIG. 9 is a plan view showing an outline of the arrangement of unit lenses in the optical member.

The lens sheet 28 is, as shown in FIGS. 8 and 9, provided with a lens portion 30 having a large number (a plurality) of unit lenses 29 aligned on the front surface (the light-emitting surface), while on the rear surface (the incident surface), provided with a reflecting layer 32 having an opening 31 corresponding to the lens portion 30. The unit lens 29 is a cylindrical lens in a nearly semicircular column shape, extending along the long side direction of the optical member 15. The lens portion 30 is a lenticular lens portion 30 having a large number of the cylindrical lenses as the unit lenses 29 aligned in a manner so as to direct their extending direction (length direction) in parallel each other. The length direction of each unit lens 29 is nearly in parallel with the edge 15a in the long side in the optical member 15, while the arrangement direction orthogonal to the length direction of each unit lens 29 is nearly in parallel with the edge 15a in the short side in the optical member 15. In short, the unit lenses 29 are arranged in parallel with the edge 15a in the optical member 15.

The reflecting layer 32 is made of such as transparent resin wherein, for example, white oxidized titanium particles are dispersedly incorporated, and has the above-mentioned opening 31 corresponding to the focus position of each unit lens 29. The reflecting layer 32 and the opening 31 intervenes between the lens sheet 28 and the diffuser sheet 27. The reflecting layer 32 and the opening 31 form a streaky shape with a prescribed width in nearly parallel with the length direction of the unit lenses 29, and forming a stripe shape on the whole. The reflecting layer 32 is formed in a prescribed width area having the valley part of each unit lens 29 as the center, while the opening 31 is formed in a prescribed width area having the top of each unit lens 29 as the center. In addition, the opening 31 is an air layer, and its refractive index is different from those of the diffuser sheet 27 and the lens sheet 28. The arrangement spacing of the unit lenses 29 (lens pitch) and that of the reflecting layer 32 (reflecting layer pitch) is designed to be almost the same, and is for example 140 μm.

When the light irradiated from each cold cathode fluorescent lamp 19 passes through the opening 31, it enters in the unit lens 29 as it is, and then is emitted therefrom with its directionality directed toward the display region in the liquid crystal panel 11. On the other hand, the light which does not pass through the opening 31 reflects on the reflecting layer 32 and returns to the side of the cold cathode fluorescent lamp 19, so as to reflect again on such as the reflective sheet 14. Reuse of the light is attempted by repeating such reflection until it passes through the opening 31. In addition, the optical member 15 can properly control the emitting direction of light (diffusing angle) by adjusting the ratio between the widths of the reflecting layer 32 and the opening 31.

The manufacturing method of the optical member 15 is simply explained. The optical member 15 is manufactured by sticking the lens sheet 28 and the diffuser sheet 27, that have been respectively and separately manufactured, together with such as an adhesive. In the manufacturing process of the lens sheet 28, after applying the reflecting layer 32 of positive type to the entire area of the rear surface of the lens sheet 28, light is irradiated from the front, so that only the reflecting layer 32 corresponding to the forming area of the opening 31 is exposed. This exposed reflecting layer 32 is then eliminated. Thereby, the opening 31 corresponding to the focus position of the unit lens 29 is formed.

However, the liquid crystal display device D using the above-mentioned optical member 15 may have a problem as below. In short, so-called moire may appear due to the interference between the arrangement of the unit lenses 29 and the arrangement of the pixel electrodes PE, depending on the relationship between the arrangement spacing of each unit lens 29 shown in FIG. 9 and that of the reflecting layer 32 in the optical member 15 and the relationship between the pitch between each wiring SL and GL in the liquid crystal panel 11 shown in FIG. 4 and the arrangement spacing of the pixel electrodes PE. In such case, the display quality is extremely degraded. As a method for avoiding such moire, conventionally, a general lens sheet with a lens portion but without a reflecting layer and an opening, which has a particular structure wherein the arrangement of the unit lenses is inclined relative to the edge, has been conventionally used. With such lens sheet, the interference between the arrangement of the pixel electrodes PE and that of the unit lenses in the liquid crystal panel 11 can be resolved.

However, with such a particular configuration wherein the unit lenses are inclined relative to the edge as mentioned above, the production cost increases even with a general lens sheet, and moreover, the manufacturing itself of the optical member 15 having the reflecting layer 32 and the opening 31 on the rear surface of the lens sheet 28 according to the present embodiment is extremely difficult. In addition, even in the case of manufacturing the lens sheet 28 where, for example, a large base material comprising the unit lenses 29 aligned in parallel with the edge is firstly produced and each lens sheet 28 is punched out from the base material, the material utilization efficiency is deteriorated when each lens sheet 28 is punched out with its edge inclined relative to the edge of the base material, resulting in an increased cost.

For the purpose of solving the above problem, the present embodiment uses the optical member 15 wherein the unit lenses 28 are arranged in parallel with the edge 15a, while being provide with an inclined posture supporting member 33 for supporting the optical member 15 in a posture so that the edge 15a of the optical member 15 and the arrangement of the unit lenses 29 are inclined relatively to the arrangement of the pixel electrodes PE in the liquid crystal panel 11. This inclined posture supporting member 33 is disposed in the side of the positioning member (the frame 18, the lamp holder 16, and the holder 17).

Particularly, as shown in FIG. 5, the inclined posture supporting member 33 is provided only in the holder 17 disposed in the vertically lower side (the lower side in FIG. 5, the left side in FIG. 7) in use state of the liquid crystal display device D among both holders 17 constituting the long side of the receiving member, and is not provided in elsewhere in the holder 17 in the vertically upper side and in both lamp holders 16 positioned in both sides. And the inclined posture supporting member 33 is formed by inclining in the horizontal direction (the long side direction of the chassis) an end surface receiving surface 26 in the holder 17 that is opposed to the end surface 15b facing vertically downward among the outer circumferential end surfaces 15b in the optical member 15. The inclined posture supporting member 33 forms a diagonally right up shape in FIG. 5 having an inclined surface that is straight like the edge 15a of the optical member 15, so as to be in surface-contact with the end surface 15b facing vertically downward in the optical member 15. And, the optical member 15 is supported by this inclined posture supporting member 33, and thereby held in a posture so that the edge 15a is inclined relative to the edge 11a in the liquid crystal panel 11.

The liquid crystal display device D as configured above is produced as followings. Each liquid crystal panel 11 and the backlight 10 is produced, and then fitted together using such as a bezel 12, so as to produce the liquid crystal display device D. The backlight 10 is manufactured by, after firstly laying the reflective sheet 14 inside of the chassis 13, mounting each cold cathode fluorescent lamp 19 having the rubber holders 20 fitted to both ends into the chassis 13, then sequentially mounting the lamp holder 16 and the holder 17, then the optical member 15 and then the frame 18 into the chassis 13.

Figure 10:
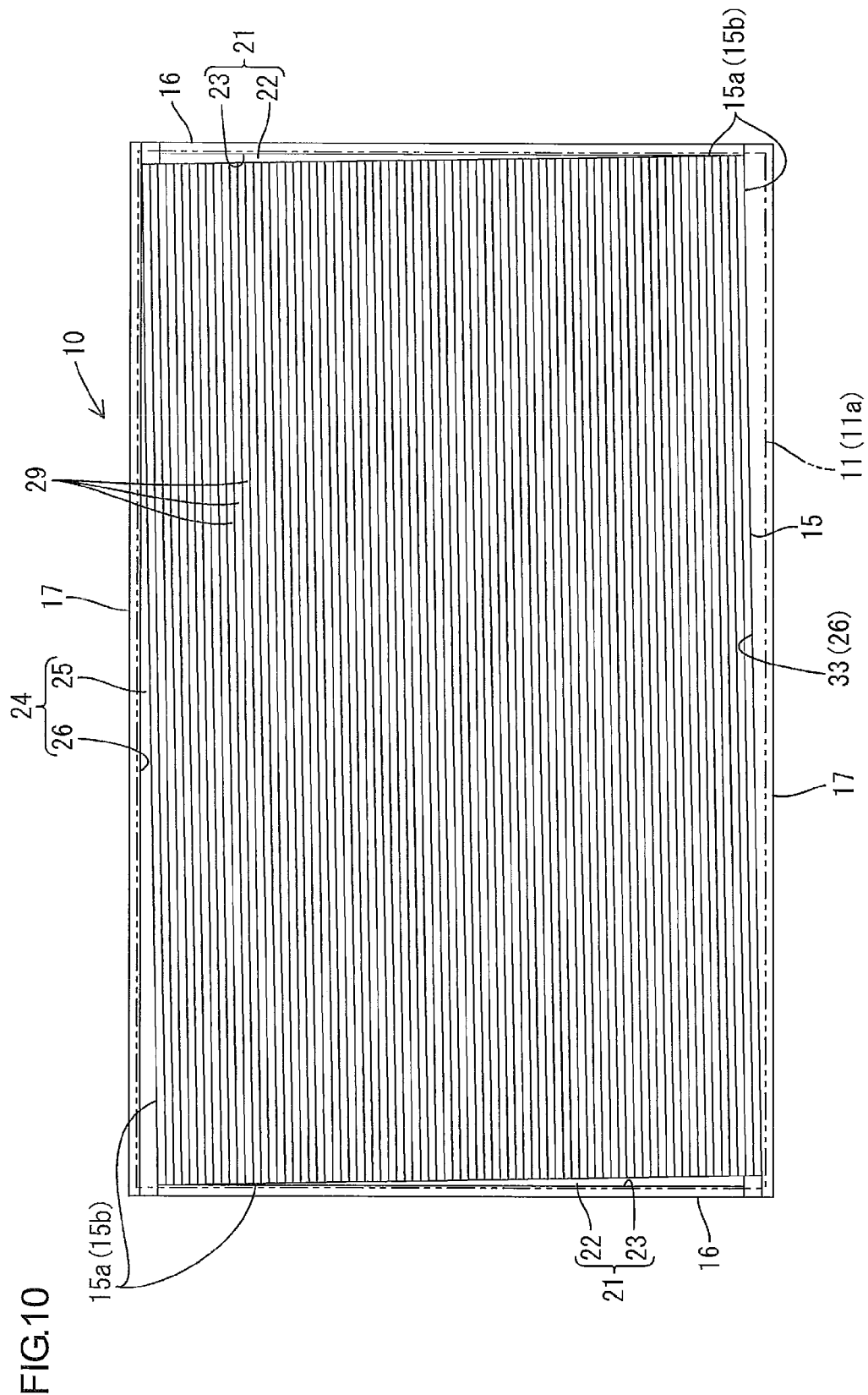
FIG. 10 is a plan view showing a state where the optical member is put onto the lamp holder and the holder.

More particularly, when the optical member 15 is put onto the receiving members 21 and 24 in the lamp holder 16 and the holder 17, as shown in FIG. 10, the outer circumferential end surface 15b in the vertically lower side in the optical member 15 in use state abuts the inclined posture supporting member 33, so that the right end part of the optical member 15 in FIG. 10 is held up. Here, the inclined posture supporting member 33 is in surface-contact with the outer circumferential end surface 15b in the vertically lower side of the optical member 15, so as to firmly support the same. Accordingly, the optical member 15 is held in a posture so that the edge 15a is inclined relatively to the length direction of the lamp holder 16 and the holder 17 (the surface direction of the end surface receiving surfaces 23 and 26). In this state, other than the portion abutting the inclined posture supporting member 33, only the corner portions in the four corners in the outer circumferential end surface 15b in the optical member 15 abut the end surface receiving surfaces 23 and 26 in the lamp holder 16 and the holder 17, while other portions are apart from the end surface receiving surfaces 23 and 26. In other words, clearances are secured between the optical member 15 supported in an inclined posture and the end surface receiving surfaces 23 and 26. In addition, in this inclined posture, each plate surface receiving surface 22 and 25 does not entirely abut the optical member 15, and therefore abutting a prescribed triangle area in the outer circumferential end part in the optical member 15.

Figure 11:
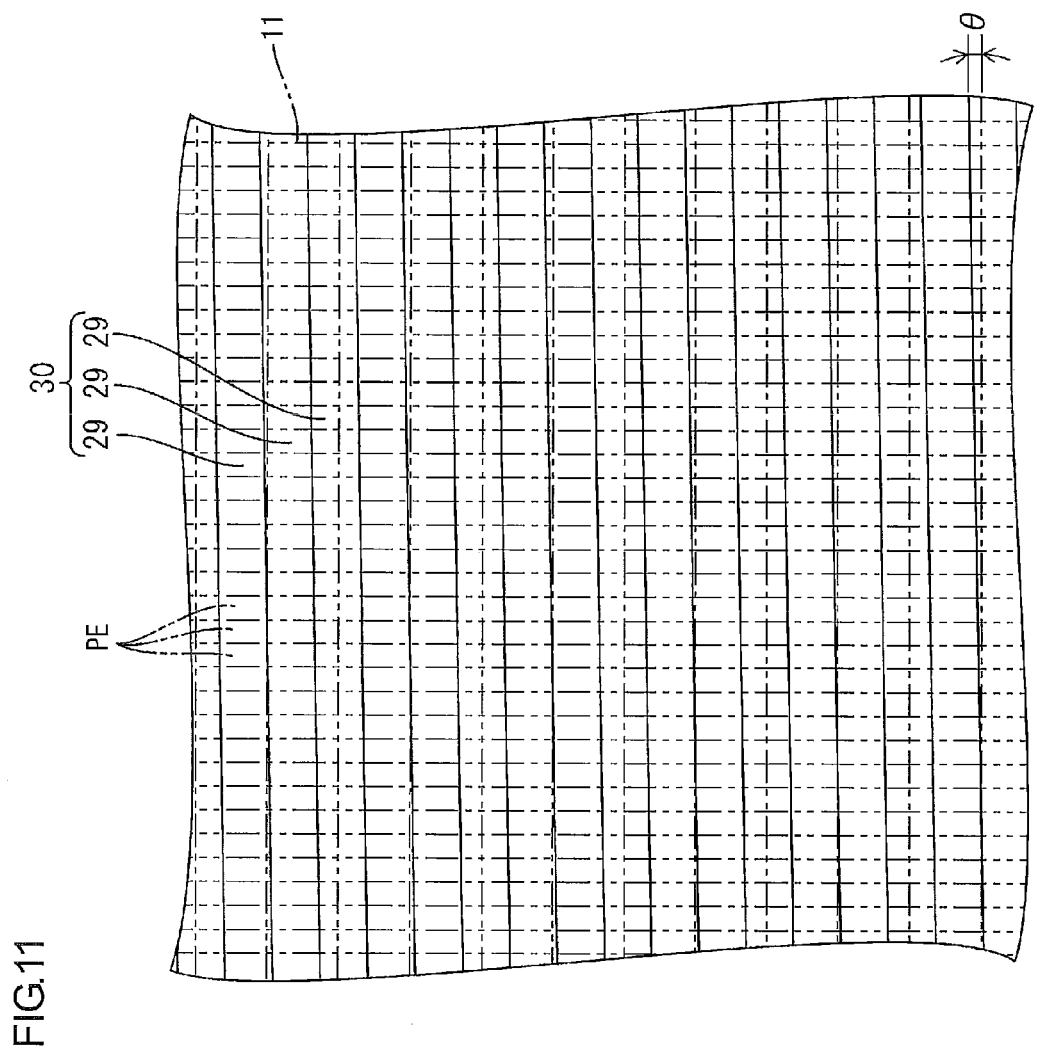
FIG. 11 is an explanation view showing a relationship between the arrangement of the unit lenses and the arrangement of the pixel electrodes.

After that, fitting the frame 18 and the liquid crystal panel 11 holds the liquid crystal panel 11 in a posture so that the edge 11a is in parallel with the length direction of the lamp holder 16 and the holder 17 as shown with a dashed-two dotted line in FIG. 10. Accordingly, the edge 15a in the optical member 15 is in a posture inclined relatively to the edge 11a in the liquid crystal panel 11. Here, as shown in FIG. 11, the arrangement of the unit lenses 29 and the reflecting layer 32 in the optical member 15 is inclined relatively to the arrangement of the pixel electrodes PE in the liquid crystal panel 11 by the inclined angle θ of the optical member 15. This prevents the occurrence of interference between the arrangement of the unit lenses 29 of the optical member 15 and the arrangement of the pixel electrodes PE in the liquid crystal panel 11, and thereby preventing moire from appearing in an image to be displayed on the liquid crystal panel 11. Moreover, even when heat expansion and heat contraction occurred to the optical member 15 at the time of lighting each cold cathode fluorescent lamp 19, clearances are secured between the outer circumferential end surface 15b in the optical member 15 and the end surface receiving surfaces 23 and 26. Therefore, the optical member 15 is allowed for expansion and contraction, thereby preventing the occurrence of sagging of the optical member 15. Additionally, the optical member 15 in an inclined posture overlaps the whole display region in the liquid crystal panel 11, though not overlapping the whole area of the liquid crystal panel 11.

The relationship between the inclined angle θ of the optical member 15 and the moire level is described with concrete examples. With the liquid crystal panel 11 and the optical member 15 under the following conditions, the moire level is evaluated as changing the inclined angle θ of the optical member 15. The result is shown in the following Table 1.

The condition of the liquid crystal panel . . . screen size: 45-inch, number of pixels: 1920×1080, pixel pitch in the long side: around 513 μm, pixel pitch in the short side: around 171 μm The condition of the optical member . . . lens pitch and reflecting layer pitch: around 140 μm

TABLE 1

| Inclined angle θ | Evaluated moire level |
|---|---|
| 0 | X |
| 1 | X |
| 2 | Δ |
| 3 | ○ |
| 4 | ◎ |
| 5 | ○ |
| 10 | ○ |

According to Table 1, when the inclined angle θ was 0 and 1 degree, moire improvement had barely appeared, however, when the inclined angle θ was within the angle range of 2 to 10 degrees, moire improvement had been obtained. Particularly, the angle range between 3 to 10 degrees was preferable, and almost no moire had been visibly-confirmed. Among them, when the inclined angle θ was 4 degrees, no moire had been visibly-confirmed, and can be regarded as the most preferable.

As described in the above, according to the present embodiment, an inclined posture supporting member 33 in a manner so as to extend in parallel with the edge 15a of the optical member is provided in the holder 17 as the positioning member for supporting the optical member 15 in a posture so that the edge 15a in the optical member 15 and the arrangement of the unit lenses 29 are inclined relatively to the arrangement of the pixel electrodes PE formed in the liquid crystal panel 11, and therefore, while using the optical member 15 comprising the lens portion 30 having the unit lenses 29 aligned in parallel with the edge 15a, the occurrence of moire caused by the interference between the arrangement of the pixel electrodes PE in the liquid crystal panel 11 and the arrangement of the unit lenses 29 can be avoided. Accordingly, a measure can be taken against moire without using a particular optical member in which the unit lenses are arranged while being inclined relative to the edge. Moreover, the inclined posture supporting member 33 is in a manner so as to extend in parallel with the edge 15a of the optical member 15, and thereby firmly supporting the optical member 15.

The holder 17 as the positioning member is made of synthetic resin and integrally formed with the inclined posture supporting member 33, thus cost reduction can be expected in comparison with the case of providing the inclined posture supporting member 33 as a body separated from the holder 17.

In addition, the inclined posture supporting member 33 is provided only in a surface arranged in the vertically lower side in use state among the opposed surfaces to the optical member 15 in the holder 17 as the positioning member, so that the minimum inclined posture supporting member 33 can surely support the optical member 15 in the inclined posture, and thereby achieving a cost reduction. Moreover, the optical member 15 is supported only in the vertically lower side by the inclined posture supporting member 33, and thus, even when there occurs heat expansion and heat contraction to the optical member, its expansion and contraction can be allowed.

The inclined posture supporting member 33 is provided in the holder 17 that is the receiving member among the positioning member for receiving the optical member 15 on the backside, and therefore, when mounting the optical member 15, the supporting posture of the optical member 15 can be determined at the same time of putting the optical member 15 onto the holder 17 as the receiving member, and thereby developing good workability.

And also, the optical member 15 is provided with the lens portion 30 on the light-emitting surface, whereas, on the incident surface in the opposite side, provided with the reflecting layer 32 having the opening 31 corresponding to the focus position of the unit lenses 29. For the thus configured optical member 15, the present embodiment is particularly effective, since it is extremely difficult to produce the one having the unit lenses 29 inclined relative to the edge 15a.

Embodiment 2

Figure 12:
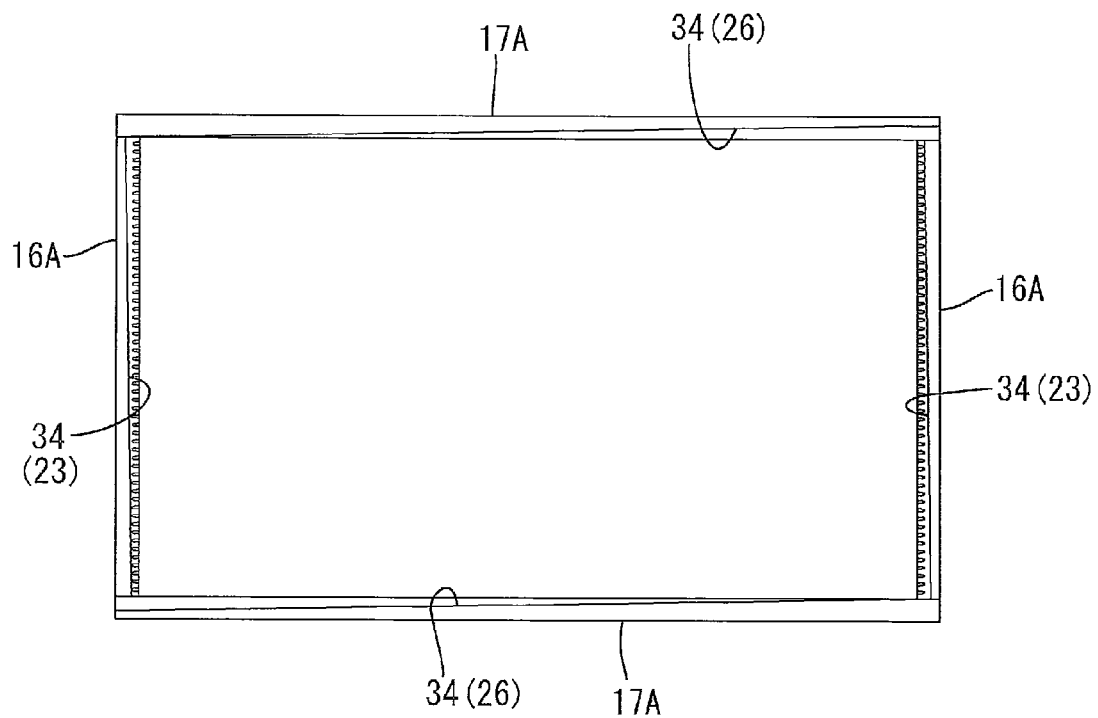
FIG. 12 is a plan view showing a mounted-state of the lamp holder and the holder in a chassis accordingly to Embodiment 2 in the present invention.
Figure 13:
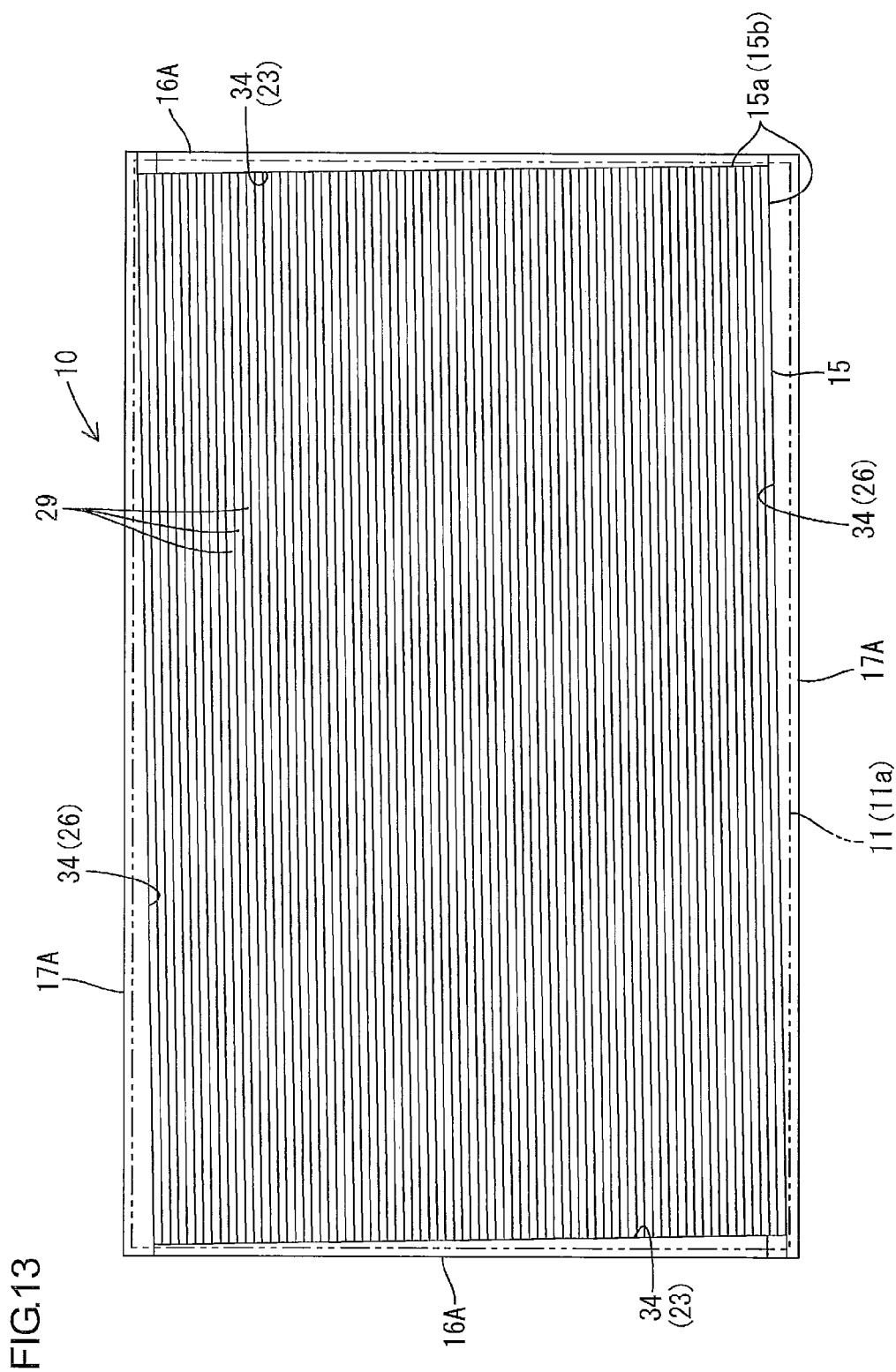
FIG. 13 is a plan view showing a state where the optical member is put onto the lamp holder and the holder.

Embodiment 2 of the present invention is explained in reference to FIG. 12 or 13. In Embodiment 2, such as the arranging position of a inclined posture supporting member 34 is changed. Additionally, in Embodiment 2, a repetitive description of the structure, action, and effect similar to those in the above Embodiment 1 is omitted.

As shown in FIG. 12, the inclined posture supporting member 34 is respectively provided in all of both lamp holders 16A and both holders 17A which compose the receiving member. In particular, the end surface receiving surfaces 26 in both holders 17A disposed in the vertically upper and lower sides in use state are inclined in the horizontal direction, forming the inclined posture supporting member 34 as an inclined surface diagonally right up shape as shown in FIG. 12 respectively formed therein. On the other hand, the end surface receiving surfaces 23 in both lamp holders 16A disposed in the right and left sides in the same figure in use state are inclined in the vertical direction, forming the inclined posture supporting member 34 as an inclined surface facing diagonally right upward respectively formed therein.

When the optical member 15 is put on, as shown in FIG. 13, the corresponding inclined posture supporting members 34 respectively abut each end surface 15b adjacent in the circumferential direction in the outer circumferential end surface 15b of the optical member 15, and thereby the optical member 15 is held in a posture so that the edge 15a is inclined relative to the length direction of the lamp holder 16A and the holder 17A. Here, the inclined posture supporting member 34 is in surface-contact with the almost entire area of the outer circumferential end surface 15b of the optical member 15, so as to support the same more firmly. This prevents the occurrence of interference between the arrangement of the unit lenses 29 and the arrangement of the pixel electrodes PE in the liquid crystal panel 11.

As described above, according to the present embodiment, among the opposed surfaces to the optical member 15 in the holder 17A and the lamp holder 16A constituting the receiving member among the positioning member, the inclined posture supporting member 34 is respectively provided in each surface adjacent in the circumferential direction, so as to more firmly support the optical member 15.

Embodiment 3

Figure 14:
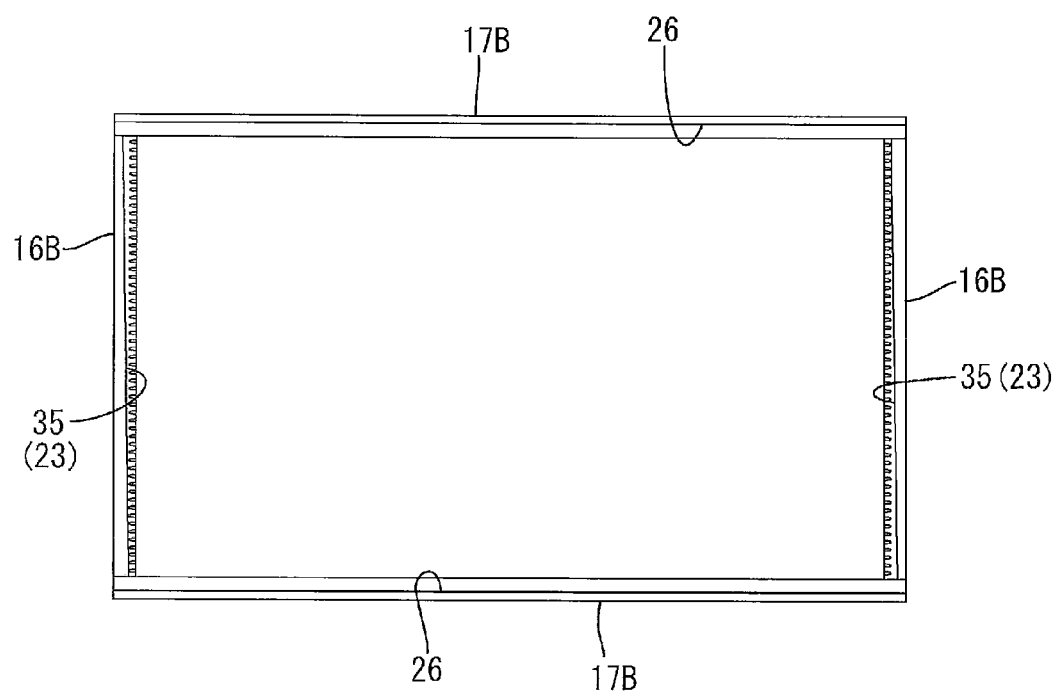
FIG. 14 is a plan view showing a mounted-state of the lamp holder and the holder in a chassis accordingly to Embodiment 3 in the present invention.
Figure 15:
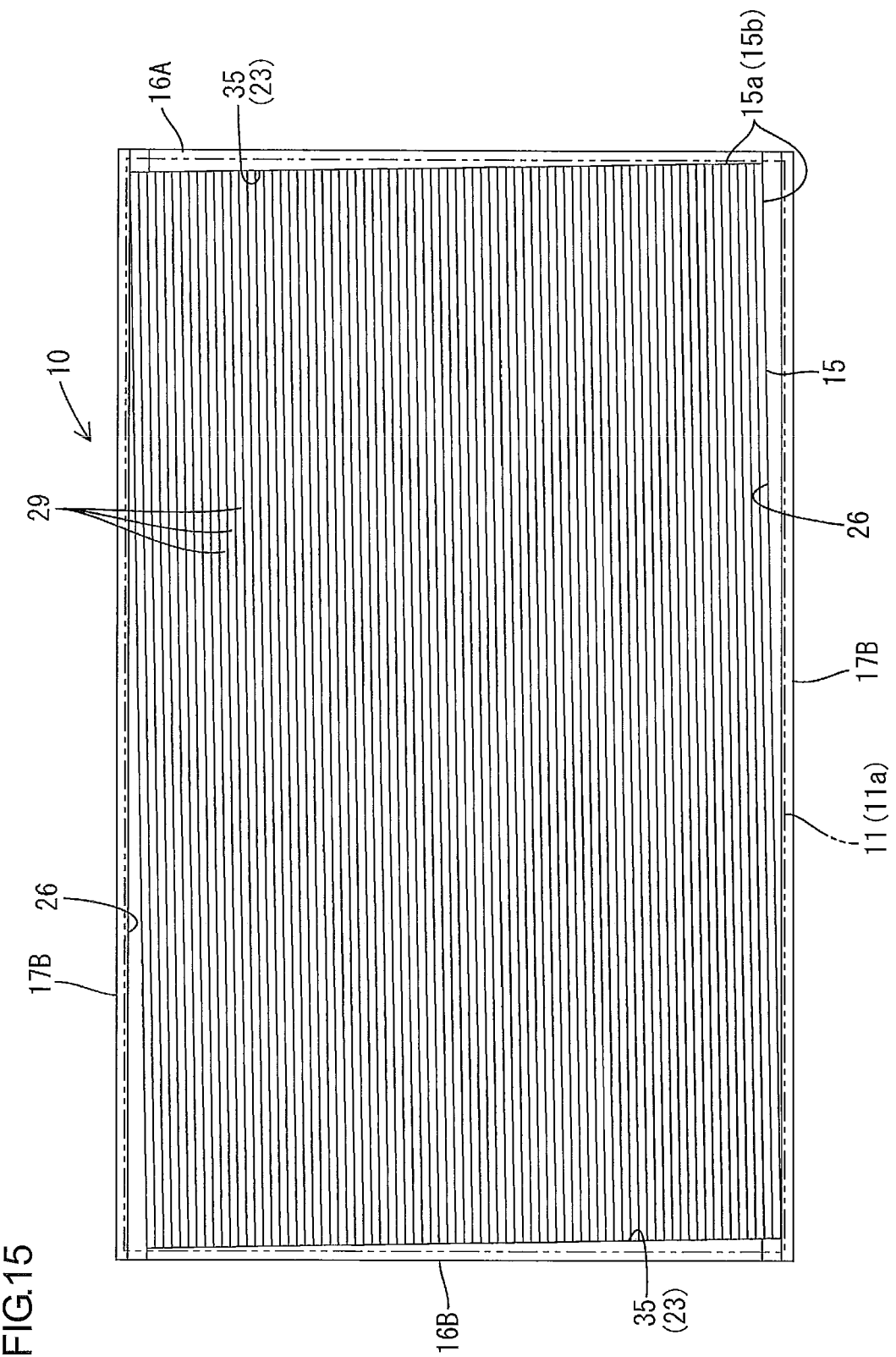
FIG. 15 is a plan view showing a state where the optical member is put onto the lamp holder and the holder.

Embodiment 3 of the present invention is explained in reference to FIG. 14 or 15. In Embodiment 3, such as the arranging position of a inclined posture supporting member 35 is changed. In Embodiment 3, a repetitive description of the structure, action, and effect similar to those in the above Embodiment 1 is omitted.

As shown in FIG. 14, the inclined posture supporting member 35 is respectively provided in both lamp holders 16B disposed in both sides among the receiving member in use state. More particularly, the end surface receiving surfaces 23 in both lamp holders 16B disposed in the right and left sides in the same figure in use state are inclined in the vertical direction, forming the inclined posture supporting member 35 as an inclined surface facing diagonally right upward respectively formed therein. On the other hand, the end surface receiving surfaces 26 in both the holders 17B are in parallel with each other along the horizontal direction.

When the optical member 15 is put on, as shown in FIG. 15, the corresponding inclined posture supporting members 35 respectively abut the end surface 15b in the short side along the vertical direction in the outer circumferential end surface 15b of the optical member 15, and thereby the optical member 15 is held in a posture so that the edge 15a is inclined relative to the length direction of the lamp holder 16B and the holder 17B. This prevents the occurrence of interference between the arrangement of the unit lenses 29 and the arrangement of the pixel electrodes PE in the liquid crystal panel 11.

Other Embodiments

The present invention is not limited to the aspects described in the above with reference to the accompanying figures, and, for example, the following can also be included in the technical scope of the present invention.

(1) Specific shape, number, and arranging position of the inclined posture supporting member may be changed accordingly.

(2) In each of the above-mentioned embodiments, the case is exemplified where the receiving member is composed of the lamp holder and the holder, however, the present invention is also applicable to the configuration where, for example, the holder is omitted, while on the other hand, the receiving member is provided for receiving the long side end part of the optical member on the long side end part of the chassis. In such case, the inclined posture supporting member may be provided in at least one of the receiving members in the chassis or the lamp holder.

(3) In the above (2), the present invention further includes the configuration where the receiving member in the lamp holder is omitted, while on the other hand, the receiving member is provided in the end part in the long side and in the end part in the short side of the chassis, so that only the chassis composes the receiving member. Furthermore, the present invention includes the configuration where a frame-shaped part as a part separated from the holder, the lamp holder, and the chassis may be used as the receiving member.

(4) In each of the above-mentioned embodiments, the inclined posture supporting member is provided in the side of the receiving member, however, the inclined posture supporting member may be provided in the side of the frame as the holding member, and such configuration is also included in the present invention. Additionally, both the receiving member and the holding member may be provided with the inclined posture supporting member.

(5) In each of the above-mentioned embodiments, the case where the unit lenses are arranged in parallel with the edge in the long side of the optical member is exemplified, however, the present invention can be also applied to the configuration where the unit lenses are arranged in parallel with the edge in the short side of the optical member.

(6) Regarding the lens portion, the present invention is applicable also to the optical member having a microlens portion composed of microlenses in a hemispherical shape as the unit lenses aligned in a matrix state, or the optical member having a cross lenticular lens portion composed of mutually-perpendicular cylindrical lenses as the unit lens arranged on the same plane.

(7) In each of the above-mentioned embodiments, the optical member, which comprises the reflecting layer having the opening in the incident surface side of the lens sheet while integrally comprising the diffuser sheet, is exemplified. However, the present invention is also applicable to the one not having the reflecting layer but having a lens sheet separated from the diffuser sheet.

(8) In each of the above-mentioned embodiments, the cold cathode fluorescent lamp is exemplified as a light source, however, the present invention is also applicable to the configuration where other kinds of linear light sources such as a hot cathode fluorescent lamp and a fluorescent tube or point light sources such as an LED are used as a light source.

(9) In each of the above-mentioned embodiments, the liquid crystal display device using the liquid crystal panel as a display panel is exemplified, however, the present invention is also applicable to a display using other kinds of display panels.

(10) In each of the above-mentioned embodiments, the television receiver comprising a tuner is exemplified, however, the present invention is also applicable to a display not comprising a tuner.

The invention claimed is:

1. An optical member unit, comprising:
   an optical member capable of transmitting light irradiated toward a display panel and comprising a lens portion where a plurality of unit lenses are arranged in parallel with the edge,
   a positioning member forming a nearly frame shape and capable of positioning the optical member in a prescribed posture relative to the display panel, and
   an inclined posture supporting member which supports the optical member in a posture so that the edge of the optical member and the arrangement of the unit lenses incline relatively to the arrangement of pixels formed on the display panel, while being provided in the positioning member in a manner so as to extend in parallel with the edge of the optical member.

2. The optical member unit according to claim 1, wherein the positioning member is made of a synthetic resin and integrally formed with the inclined posture supporting member.

3. The optical member unit according to claim 1, wherein the inclined posture supporting member is placed only in a surface arranged in the vertically lower side in use state among the opposed surfaces to the optical member in the positioning member.

4. The optical member unit according to claim 1, wherein the inclined posture supporting member is provided respectively in each adjacent surface in the circumferential direction among the opposed surfaces to the optical member in the positioning member.

5. The optical member unit according to claim 1, wherein the positioning member is composed of a receiving member for receiving the optical member on the backside and a holding member for holding the optical member from the front side, and wherein the inclined posture supporting member is provided in the side of the receiving member.

6. The optical member unit according to claim 1, wherein the optical member is provided with the lens portion on a light-emitting surface, whereas, on an incident surface in the opposite side, provided with the reflecting layer having an opening corresponding to the focus position of the unit lenses.

7. A lighting device for display, comprising: the optical member unit according to claim 1, and a light source disposed in the backside of the optical member unit.

8. A display composed of the lighting device for display according to claim 7 and a display panel disposed in the front side of the lighting device for display.

9. The display according to claim 8, wherein the display panel is a liquid crystal panel comprising a liquid crystal sealed in between a pair of substrates.

10. A television receiver comprising the display according to claim 8.

* * * * *